Nov. 19, 1963     E. E. SIVACEK     3,110,954
METHOD FOR MANUFACTURING A THERMO-RESPONSIVE DEVICE
Original Filed Aug. 20, 1956
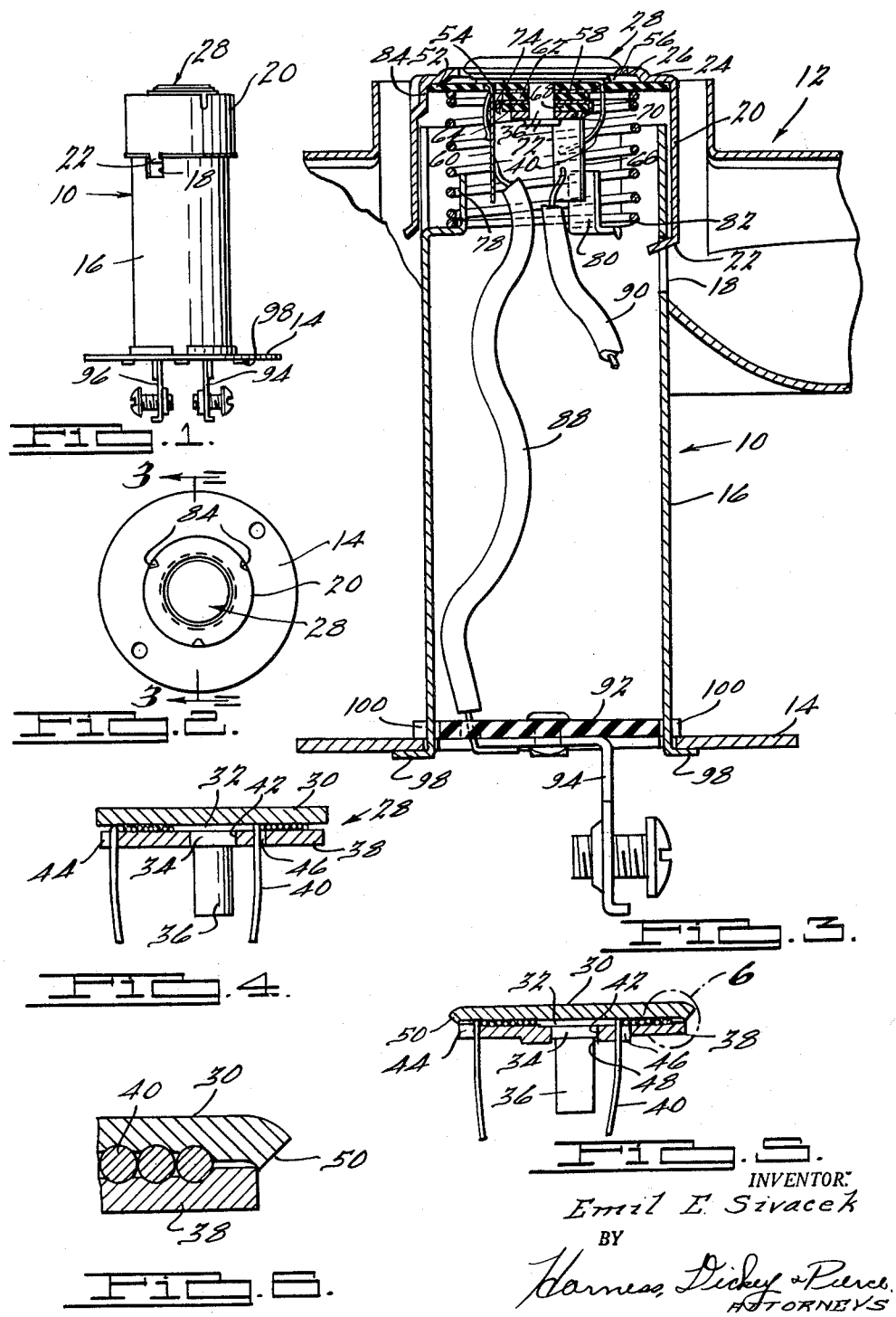
INVENTOR:
Emil E. Sivacek
BY
Harness, Dickey & Pierce
ATTORNEYS United States Patent Office 3,110,954
Patented Nov. 19, 1963

3,110,954
METHOD FOR MANUFACTURING A THERMO-RESPONSIVE DEVICE
Emil E. Sivacek, Ann Arbor, Mich., assignor to King-Seeley Thermos Co., a corporation of Michigan
Original application Aug. 20, 1956, Ser. No. 604,917, now Patent No. 2,980,875, dated Apr. 18, 1961. Divided and this application Sept. 3, 1959, Ser. No. 837,936
13 Claims. (Cl. 29—155.63)

This invention relates to methods of manufacturing of transducing devices for reflecting changes of experienced temperature into corresponding variations in a characteristic of the device.

This application is a division of my application, Serial No. 604,917, filed August 20, 1956, now Patent 2,980,875, granted April 18, 1961.

The accuracy which can be feasibly achieved in the measurement or control of the temperature of a body or mass is determined by a number of characteristics of the temperature sensing device. First, the device should be highly sensitive, manifesting a large change in its output characteristic in response to a minute change in its temperature. For example, the fluid employed in hydraulic or pneumatic sensing devices should have a high coefficient of thermal expansion, and the polymetallic elements employed in certain mechanical sensing devices should reflect a small temperature change in a significant physical movement. Desirably, the relationship between the sensed temperature and the magnitude of the output characteristic of the senser should be rectilinear to facilitate indication and control. The device should be mechanically rugged and must be capable of withstanding any temperatures within the range it is expected to sense. As an element of the requirement for high sensitivity, the thermal inertia of the senser should be very low, its output characteristic should change effectively instantaneously any change in temperature of the body or mass. The senser should, at least in many applications, also possess a high degree of selectivity, that is, it should be so constructed and disposed as to sense only the temperature of the designated body or mass.

Refined techniques have been devised for improving the sensitivity of substantially all types of sensing devices, the intimacy of heat transfer relationship between the senser and the body, and the shielding of the senser from extraneous heat sources. It has previously been appreciated that an electrical resistance element having a high positive or negative coefficient of resistance is well adapted for use as a sensing element, being compact and sensitive and having an output characteristic that can be readily translated for indication or control purposes. A number of patents suggest the use of high negative coefficient of resistance elements as sensers and teach various constructions and mountings for those elements. Others have concluded that the rectilinearity of the output characteristic and the stability of the unit even at relatively high sensed temperatures recommends sensing resistors having a high positive temperature coefficient of resistance, representative arrangements being illustrated in Patent 1,446,880, granted February 27, 1923 to O. A. Colby, in Patent 2,163,297 granted June 20, 1939 to A. H. Waage, in Patent 2,207,871, granted July 16, 1940 to J. W. Myers, in Patent 2,236,624, granted April 1, 1941 to L. F. Littwin, in Patent 2,552,480, granted May 8, 1951 to J. W. Dickey, in Patent 2,463,984, granted March 8, 1949 to K. M. Lederer, in Patent 2,686,250, granted August 10, 1954 to G. W. Schroeder and in other prior-art disclosures.

The principles of the present invention relate to the manufacture of the latter type of sensing element. While a number of high positive temperature coefficient of resistance senser elements in the art have possessed a number of desirable characteristics, the unit disclosed as the representative embodiment of the present invention is believed to meet the foregoing requirements and others to a substantially improved degree. Since one of the significant advantages of the disclose arrangement lies in its selectivity, in its capability of being effectively non-responsive to extraneous heat sources, the sensing unit is disclosed in an arrangement adapted to sense the temperature of a pan or pot disposed upon a stove surface heating unit. A number of prior art arrangements, while well suited for employment where the sensitivity requirements are low, where the senser is not subjected to extraneous sources of heat, or where the temperatures to which the senser will be subjected are relatively low, are neither designed nor adapted nor suitable for use in connection with a stove surface unit.

In general, the disclosed device comprises a pellet mountable in the central cavity in a stove surface unit and having a relatively large upper surface area to provide accurate sensing of the temperature of the pot or pan but being sufficiently thin so that the amount of sensing area subjected to direct heat from the surface unit is very small. The pellet is flexibly supported so that it protrudes above the plane of the surface unit in a position to be engaged by the pan and deflected downwardly by the weight of the pan, thereby insuring intimate heat transfer relationship between the pan and the senser. The senser resistance itself is effectively sealed within a metal canister so that the senser itself cannot readily become wet, dirty or damaged.

In the preferred form of sensing pellet, the wire is in the form of a planar spiral sandwiched between and embedded in one or both of a pair of relatively thin plates, the ends of the wire extending through notches or apertures in the lower of the two plates. In constructing the device, the wire is wound on an arbor and in a single layer between the two plates. After winding, the plates are pressed together under great force until portions of their adjacent surfaces lie substantially in a common plane. Additionally, the arbor itself becomes integrally embedded in at least one of the plates and an extension on that arbor serves not only as a further means for securing the plates together but also acts as a supporting element for the output terminal structure and for certain additional elements which are provided to facilitate mounting of the senser.

A suitable system with which the disclosed senser may be associated is disclosed in the patent application of George B. Whinery, Serial No. 604,867, filed August 20, 1956, entitled Thermo-Responsive System, now Patent No. 3,005,896. The nature of the invention will be more clearly understood from the following description of a representative embodiment of the invention and of the method of manufacture thereof, when read with reference to the accompanying drawings in which:

FIGURE 1 is a front elevational view of a sensing unit embodying the principles of the present invention;

FIG. 2 is a top plan view of the sensing structure shown in FIG. 1;

FIG. 3 is a sectional view taken substantially along the line 3—3 of FIG. 2, and illustrates a representative relationship between the sensing unit and a stove surface heating unit;

FIG. 4 is a sectional view of the sensing pellet during the course of its manufacture;

FIG. 5 is a sectional view of the sensing pellet after the two major constituent plates thereof have been pressed together; and FIG. 6 is an enlarged view of the portion within the circle 6 on FIG. 5.

The senser 10 is designed to be disposed within the central opening of an electrical resistance type of stove surface heating unit 12, the senser being supported within that unit by means of an integral mounting plate 14 bolted or otherwise secured to the range or stove structure.

Senser 10 comprises a tubular housing 16 having, near its upper end, three peripherally spaced slots 18. A generally tubular cap 20, telescoped over the upper end of the housing 16, is provided with three spaced-apart retaining tabs 22 depending from its lower edge and bent inwardly to engage the corresponding slots 18. The clearance between the inner diameter of cap 20 and the outer diameter of housing 16 is sufficient to permit free relative sliding motion, the upper surface of retaining tabs 22 serving as a limit stop to upward motion of cap 20 relative to housing 16 and, if desired, the lower surface of those tabs serving as a limit stop to the downward motion of cap 20 relative to housing 16.

The upper end of the cap 20 is partially closed by a stepped flange 24 defining a central aperture 26. A sensing pellet 28 is resiliently supported centrally of the aperture 26.

As may most clearly be seen in FIGS. 4 and 5 of the drawings, sensing pellet 28 comprises a top plate or arbor head 30, an arbor means or body 32, an arbor shoulder 34, an arbor shank 36, a backing plate or disk 38 and a resistance wire 40.

Sensing wire 40 is a fine, insulated wire having a substantial temperature coefficient of resistance. Excellent results have been achieved by employing a nickel-iron alloy wire having a temperature coefficient of resistance of 0.0045 ohms per ohm per degree centigrade measured at 68° F. The tested wire was approximately number 38 B & S gauge wire drawn to a resistance of about 8 ohms per foot at 68° F. The specific resistance of the tested wire was about 120 ohms per circular mil foot at 68° F., and, in the tested embodiment of the invention, the length of that wire was selected to provide a resistance at 68° F. of about 10 ohms, that resistance value rising to approximately 20 ohms at 450° F.

Since wire 40 is disposed in a series of abutting turns and is in abutting relation with metallic elements, it must be insulated and the insulation must be of a type which will maintain its integrity under the mechanical and thermal stresses to which the wire is subjected during manufacture and use. The most satisfactory insulation which has as yet been tested is a double glass insulation applied, with a binder, over the annealed and enameled wire. The insulated wire, as a representative specific example, may have a diameter or preselected initial thickness in the order of 0.011 inches.

In the illustrated arrangement the arbor 32 is in the form of a disk formed integrally with top plate 30, arbor shoulder 34 is in the form of a disk of smaller diameter than arbor 32 and formed integrally therewith, whereas shank 36 is of still further reduced diameter and is formed integrally with shoulder 34. Backing plate 38 is provided with a central aperture 42 adapted to accept the arbor shoulder portion 34. As representative specific examples of appropriate sizes of these elements, the cylindrical top plate 30 may be in the order of 17/32 of an inch in diameter and 1/32 of an inch thick, backing plate 38 is the same in thickness as plate 30 and is desirably slightly smaller in diameter, such as 1/2 of an inch in diameter. The thickness of arbor 32 is preferably about the same as the thickness of the insulated wire 40. As will be seen, it is highly advantageous from an assembly standpoint that arbor 32 be no thinner than insulated wire 40 and, conversely, that it be sufficiently thin so that a single-layer winding of wire 40 is insured. In practice, it is preferred to form arbor 32 about 0.001 to 0.003 inch thicker than the diameter of insulated wire 40. The thickness of arbor shoulder 34 is representatively identical to the thickness of washer or backing plate 38 and the aperture 42 in plate 38 is preferably only enough larger than shoulder 34 to permit that plate to be slipped over the shoulder 34 without the necessity of exerting any substantial force.

Backing plate or washer 38 is provided, at one point in its periphery, with a notch or slot 44 sufficiently large to accept the wire 40. While an aperture spaced from the edge of plate 38 will function as a satisfactory equivalent, the provision of a notch facilitates assembly, as will be noted. In practice, notch 44 is about 1/32" wide and extends radially inwardly about the same distance. Plate 38 is additionally provided with an aperture 46 representatively disposed on a diameter with notch 44. Aperture 46 is sufficiently large so that wire 40 may be readily passed therethrough and is so radially located that wire 40, when passing therethrough, will be approximately aligned with a point on the periphery of arbor body 32. In a practical embodiment, aperture 46 was made about three times the diameter of insulated wire 40 and was so located that its innermost edge was approximately in line with the edge of arbor 32. With the foregoing sizes, this may be accomplished by drilling a 1/32" diameter hole centered 7/64" from the center of plate 38.

In assembling the unit, the end of wire 40 is inserted through the aperture 46 in the washer or backing plate 38 and the washer is then inserted over shank 36 and seated upon shoulder 34 in abutment with the face of arbor body 32, the free end of the wire extending in the direction of the shank. The spool of wire and the assembled plates and arbor are then rotated relative to one another about the longitudinal axis of the shank 36 either by fixing shank 36 against rotation and moving the wire in a circular path or by rotating the shank 36 and hence the arbor 32 about its longitudinal axis while feeding the wire from a fixed point. With the end of the wire 40 restrained against movement through aperture 46, and with the portion of the wire adjacent that aperture but between the plates 30 and 38 lying against the peripheral surface of arbor 32, this relative rotational motion will cause the wire to be spiralled in a single layer coil as illustrated, the coil building up between the adjacent surfaces of the plates 30 and 38. The position of notch 44 and the diameter of arbor 32 are selected so that when the arbor assembly has been filled to the indicated level and the wire brought through the notch 44, the proper length of wire will have been emplaced. When the wire 40 has been severed from the reel the assembled unit will appear as illustrated in FIG. 4 of the drawings.

The next step in manufacturing the senser pellet is to effectively seal the sensing wire between the plates 30 and 38, establishing, in the process, an intimate heat exchange relationship between those plates and the senser wire. This is accomplished by placing the unit, as assembled in FIG. 4, in a press adapted to provide forces of substantial magnitude pressing plates 30 and 38 together. Desirably, but not imperatively, this compressing action is of sufficient magnitude to move portions of the adjacent surfaces of the plates 30 and 38 into engagement with one another. It has been found that if plates 30 and 38 are formed of proper materials the wire 40 may be physically embedded in one or both of the adjacent surfaces of those plates so that the area of engagement between the insulated wire surface and the plates will be substantial. One or both of the plates 30 and 38 are preferably formed of a material of sufficient ductility and softness to permit such embedding, such as selected grades of aluminum. It has been found that the insulation upon wire 40 will maintain its electrical integrity despite the mechanical and thermal stresses to which it is subjected whether it remains physically integral or whether it is fractured in minute particles during the compressing and embedding operation.

In the compressing operation, a die is preferably employed which will permit the central portion of plate 38 to be effectively extruded by arbor 32, producing the discontinuous lower surface or protuberance on plate 38 which is illustrated in FIG. 5 of the drawings.

To insure that the elements 30 and 38 will not become separated and will seal the senser wire 40, the arbor shoulder 34 is staked as at 48. Additionally, either as a separate operation or as an element of the compressing operation, the edges of plate 30 are rolled over as at 50 to establish or insure a seal at the periphery of the pellet.

It will be observed that in the preferred arrangement, the pellet assembly comprises a resistance wire sandwiched between a headed arbor and a washer. Pellets have also been satisfactorily formed with top plate 30 and arbor 32 being separately manufactured and being screwed or otherwise interjoined as an element of the assembly operation.

The completed pellet or sandwich, as illustrated in FIG. 5, is then employed as an element of a terminal and support sub-assembly. Thus, a centrally apertured support disk or plate 52 (FIG. 3), which may be made, for example, of mica, is placed over shank 36 and in abutment with the backing plate 38, the ends of wire 40 being passed through appropriately positioned apertures 54 and 56 in that support plate.

A terminal strip or bus having an enlarged, circular, centrally apertured base portion 58 and a depending leg portion 60 is next placed upon shank 36, with the upper face of portion 58 abutting the lower face of support plate 52. One end of wire 40 is soldered or otherwise secured to this terminal strip. In the illustrated arrangement, the central aperture in portion 58 is approximately the same diameter as shank 36 so that the pellet plates 30 and 38 and shank 36 are electrically connected to one end of the sensing wire. This electrical interrelation may, of course, be readily avoided if it is undesirable from a circuit standpoint.

A flat insulating washer 62 is then placed upon shank 36 in abutment with terminal strip base portion 58 after which the base portion 64 of a second terminal strip including a depending leg portion 66 is placed upon shank 36. The other end of wire 40 is soldered or otherwise rendered electrically integral with depending leg 66. Insulating washer 68 and metallic washer 70 complete the terminal stack, with shank 36 being headed over as at 72 to integrate the assembly. The central aperture in terminal strip base portion 64 is substantially greater than the shank 36 to avoid an electrical connection therebetween. Centering of that aperture relative to the shank 36 is representatively insured by forming a peripheral skirt 74 on the base portion 64 engaging portions of the periphery of insulating washer 68.

Three offset projections including projections 78 and 80 are formed near the upper end of the housing 16 to define a spring seat centrally disposed within that housing and adapted to accept a compression spring 82 of smaller diameter than the diameter of the housing 16. The upper end of spring 82 bears against the lower surface of support plate 52, the upper surface of support plate 52 in turn bearing against the stepped flange partial end closure 24 of the cap 20. In the illustrated arrangement the upper ends of the side walls of cap 20 are lanced and deflected inwardly at three points to define three keying projections 84 adapted to be engaged by three corresponding peripherally spaced notches in the support plate 52.

Spring 82 therefore exerts a continuing force tending to move support plate 52, cap 20 and pellet 28 upwardly to illustrated position which is established by the engagement between the retaining tabs 22 and the upper ends of the housing slots 18. In this position, the upper surface of pellet 28 should lie in a plane above that of the surface of the stove's heating unit to insure that a pot or pan placed upon that heating unit will engage the pellet 28 even though the undersurface of the pan or pot is non-planar. The force exerted by spring 82 is relatively small so that even the lightest pan expected to be placed upon the stove will be sufficiently heavy to move pellet 28 and cap 20 downwardly in order to permit portions of the bottom surface of the pot or pan to be in direct contact with the heating unit. Slots 18 in housing 10 are preferably substantially longer than the distance which the upper surface of sensing pellet 28 extends above the plane of the heating unit.

Insulated lead wires 88 and 90 are electrically secured to depending terminal strip portions 60 and 66, respectively. These wires pass through apertures in insulating terminal plate 92 and are soldered, welded or otherwise electrically secured to individual terminals 94 and 96, respectively, both of which are riveted or otherwise secured to terminal plate 92.

Terminal plate 92 is a disk having a diameter greater than the outside diameter of housing 16 and the major portion of the lower edge of that housing rests upon the upper surface of terminal plate 92. However, a plurality of peripherally-spaced depending tabs 98 are provided at the lower edge of housing 16 and these tabs 98 pass through correspondingly spaced notches 100 in the edge of terminal plate 92. Tabs 98 also pass through an enlarged central aperture in the generally annular metallic mounting plate 14 and are bent outwardly to effectively clamp terminal plate 92 and mounting plate 14 together.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. The method of manufacturing a thin temperature sensing pellet assembly for disposition centrally of a stove surface heater and subject to circumferential heating thereby for sensing the temperature of a body being heated by the heater and having a fine electrically insulated resistance wire having a high temperature coefficient of resistance and sandwiched between a pair of plates one of which is adapted to engage the body being heated by the heater which comprises the steps of placing a plate and a thin ductile metal plate in substantial parallelism with one another with the fine electrically insulated wire in a single layer between the plates, establishing an intimate heat transfer relationship between the electrically insulated wire and at least one of the plates and reducing direct heat transfer from the heater by reducing the edge area of the pellet by moving portions of the plates towards one another to a position in which the layer of electrically insulated wire is forced at least partially into the surface of the ductile metal plate to permanently distort that surface to partially conform to the shape of the electrically insulated wire without producing corresponding distortion of the opposite surface of that ductile metal plate and securing the plates in fixed relation to one another.

2. The method of manufacturing a thin temperature sensing pellet assembly for disposition centrally of a stove surface heater and subject to circumferential heating thereby for sensing the temperature of a body being heated by the heater and having a fine electrically insulated resistance wire having a high temperature coefficient of resistance and sandwiched between a pair of plates one of which is adapted to engage the body being heated by the heater which comprises the steps of placing a pair of ductile metal plates in substantial parallelism with one another with the fine electrically insulated wire in a single layer between the plates, establishing an intimate heat transfer relationship between the electrically insulated wire and the plates and reducing direct heat transfer from the heater by reducing the edge area of the pellet by moving portions of the plates towards one another to a position in which the layer of electrically insulated wire is forced at least partially into the surface of both of the ductile metal plates to permanently distort those surfaces to partially conform to the shape of the electrically insulated wire without producing corresponding distortion of the opposite surfaces of those ductile metal plates and securing the plates in fixed relation to one another.

3. The method of manufacturing a thin temperature sensing pellet assembly for disposition centrally of a stove surface heater and subject to circumferential heating thereby for sensing the temperature of a body being heated by the heater and having a fine electrically insulated resistance wire having a high temperature coefficient of resistance and sandwiched between a pair of plates one of which is adapted to engage the body being heated by the heater which comprises the steps of placing and holding one plate with a portion thereof substantially in spaced parallelism with a portion of a ductile metal plate, winding the electrically insulated wire in a single layer between and paralleling and engaging said portions of the plates with those portions guiding the wire in the formation of the layer, establishing an intimate heat transfer relationship between the electrically insulated wire and at least one of the plates and reducing direct heat transfer from the heater by reducing the edge area of the pellet by moving portions of the plates towards one another to a position in which the layer of electrically insulated wire is forced at least partially into the surface of the ductile metal plate to permanently distort that surface to partially conform to the shape of the electrically insulated wire without producing corresponding distortion of the opposite surface of that ductile metal plate and securing the plates in fixed relation to one another.

4. The method of manufacturing a thin temperature sensing pellet assembly for disposition centrally of a stove surface heater and subject to circumferential heating thereby for sensing the temperature of a body being heated by the heater and having a fine electrically insulated resistance wire having a high temperature coefficient of resistance and sandwiched between a pair of plates one of which is adapted to engage the body being heated by the heater, one of said plates having an element secured thereto projecting through an aperture in the other plate, which comprises the steps of placing the apertured plate on the element in substantial parallelism with the other plate and spaced therefrom a distance sufficient to permit the movement of the electrically insulated wire therebetween but close enough to insure a single-layer winding of the electrically insulated wire, winding the electrically insulated wire in a single layer between and paralleling and engaging said portions of the plates with those portions guiding the wire in the formation of the layer with the turns building up on the preceding turns, establishing an intimate heat transfer relationship between the electrically insulated wire and at least one of the plates and reducing direct heat transfer from the heater by reducing the edge area of the pellet by moving portions of the plates towards one another to a position in which the layer of electrically insulated wire is forced partially into the surface of the ductile metal plate to permanently distort that surface to partially conform to the shape of the electrically insulated wire without producing corresponding distortion of the opposite surface of that ductile metal plate and securing the apertured plate in fixed relation to a portion of the element to secure the plates in fixed relation to one another.

5. The method of manufacturing a thin temperature sensing pellet assembly for disposition centrally of a stove surface heater and subject to circumferential heating thereby for sensing the temperature of a body being heated by the heater and having a fine electrically insulated resistance wire of preselected thickness having a high temperature coefficient of resistance and sandwiched between a pair of plates which comprises the steps of placing a plate and a thin ductile metal plate in substantial parallelism with one another with the electrically insulated wire in a single layer between the plates, establishing an intimate heat transfer relationship between the electrically insulated wire and at least one of the plates by moving portions of the plates towards one another to a position in which portions of said plates are closer together than the said preselected thickness of said electrically insulated wire with portions of the surface of at least the ductile metal plate which abut the electrically insulated wire being compressed and reduced in thickness and with the electrically insulated wire forced at least partially into the surface of at least said ductile metal plate to permanently distort that surface to partially conform to the shape of the electrically insulated wire without producing corresponding distortion of the opposite surface of that ductile metal plate and to at least partially embed the electrically insulated wire in that surface and securing the plates in fixed relation to one another.

6. The method of manufacturing a thin temperature sensing pellet assembly for disposition centrally of a stove surface heater and subject to circumferential heating thereby for sensing the temperature of a body being heated by the heater and having a fine electrically insulated resistance wire of preselected thickness having a high temperature coefficient of resistance and sandwiched between a pair of plates one of which is adapted to engage the body being heated by the heater which comprises the steps of placing a pair of ductile metal plates in substantial parallelism with one another with the electrically insulated wire in a single layer between the plates, establishing an intimate heat transfer relationship between the electrically insulated wire and the plates by moving portions of the plates towards one another to a position in which portions of said plates are closer together than the said preselected thickness of said electrically insulated wire with portions of the surfaces of the ductile metal plates which abut the electrically insulated wire being compressed and reduced in thickness and with the electrically insulated wire forced partially into the surfaces of said ductile metal plates to permanently distort those surfaces to partially conform to the shape of the electrically insulated wire without producing corresponding distortion of the opposite surfaces of those ductile metal plates and to partially embed the electrically insulated wire in those surfaces and securing the plates in fixed relation to one another.

7. The method of manufacturing a thin temperature sensing pellet assembly for disposition centrally of a stove surface heater and subject to circumferential heating thereby for sensing the temperature of a body being heated by the heater and having a fine electrically insulated resistance wire of preselected thickness having a high temperature coefficient of resistance and sandwiched between a pair of plates which comprises the steps of placing and holding one plate with a portion thereof substantially in parallelism with a portion of a ductile metal plate and spaced therefrom a distance sufficient to permit movement of the electrically insulated wire therebetween but close enough to insure a single-layer winding of the electrically insulated wire, winding the electrically insulated wire in a single layer between and paralleling and engaging said portions of the plates with those portions guiding the wire in the formation of the layer, establishing an intimate heat transfer relationship between the electrically insulated wire and at least one of the plates by moving portions of the plates towards one another to a position in which portions of said plates are closer together than the said preselected thickness of said electrically insulated wire with portions of the surface of at least the ductile metal plate which abut the electrically insulated wire being compressed and reduced in thickness and with the electrically insulated wire forced at least partially into the surface of at least said ductile metal plate to permanently distort that surface to partially conform to the shape of the electrically insulated wire without producing corresponding distortion of the opposite surface of that ductile metal plate and to at least partially embed the electrically insulated wire in that surface and securing the plates in fixed relation to one another.

8. The method of manufacturing a thin temperature sensing pellet assembly for disposition centrally of a stove surface heater and subject to circumferential heating thereby for sensing the temperature of a body being heated by the heater and having a fine electrically insulated resistance wire of preselected thickness having a high temperature coefficient of resistance and sandwiched between a pair of plates, one of said plates being of ductile metal, one of said plates having an element secured thereto projecting through an aperture in the other plate, which comprises the steps of placing the apertured plate on the element in substantial parallelism with the other plate with the electrically insulated wire in a single layer between the plates and to each side of the element and with a portion of the element projecting through the aperture in the apertured plate, establishing an intimate heat transfer relationship between the electrically insulated wire and at least one of the plates by moving portions of the plates towards one another to a position in which portions of said plates are closer together than the said preselected thickness of said electrically insulated wire with portions of the surface of at least the ductile metal plate which abut the electrically insulated wire being compressed and reduced in thickness and with the electrically insulated wire forced at least partially into the surface of at least said ductile metal plate to permanently distort that surface to partially conform to the shape of the electrically insulated wire without producing corresponding distortion of the opposite surface of that ductile metal plate and to at least partially embed the electrically insulated wire in that surface and securing the apertured plate in fixed relation to a portion of the element to secure the plates in fixed relation to one another.

9. The method of manufacturing a thin temperature sensing pellet assembly for disposition centrally of a stove surface heater and subject to circumferential heating thereby for sensing the temperature of a body being heated by the heater and having a fine electrically insulated resistance wire of preselected thickness having a high temperature coefficient of resistance and sandwiched between a pair of plates, one of said plates being of ductile metal, one of said plates having an element secured thereto projecting through an aperture in the other plate, which comprises the steps of placing the apertured plate on the element in substantial parallelism with the other plate and spaced therefrom a distance sufficient to permit the movement of the electrically insulated wire therebetween but close enough to insure a single-layer winding of the electrically insulated wire, winding the electrically insulated wire in a single layer between and paralleling and engaging said portions of the plates with those portions guiding the wire in the formation of the layer and with the turns building up on the preceding turns, establishing an intimate heat transfer relationship between the electrically insulated wire and at least one of the plates by moving portions of the plates towards one another to a position in which portions of said plates are closer together than the said preselected thickness of said electrically insulated wire with portions of the surface of at least the ductile metal plate which abut the electrically insulated wire being compressed and reduced in thickness and with the electrically insulated wire forced partially into the surface of at least said ductile metal plate to permanently distort that surface to partially conform to the shape of the electrically insulated wire without producing corresponding distortion of the opposite surface of that ductile metal plate and to partially embed the electrically insulated wire in that surface and securing the apertured plate in fixed relation to a portion of the element to secure the plates in fixed relation to one another.

10. The method of manufacturing a thin temperature sensing pellet assembly for disposition centrally of a stove surface heater and subject to circumferential heating thereby for sensing the temperature of a body being heated by the heater and having a fine electrically insulated resistance wire of preselected thickness having a high temperature coefficient of resistance and sandwiched between a pair of plates which comprises the steps of placing a plate and a thin ductile metal plate with their adjacent faces in substantial parallelism with one another and with the exterior faces of the two plates spaced a distance apart and with the electrically insulated wire in a single layer between the plates and spaced from the central portion thereof, establishing an intimate heat transfer relationship between the electrically insulated wire and at least one of the plates by applying a die to the exterior face of one of the plates having a central portion cut away so as to engage primarily the portion of that exterior face outward of said central portion and applying a force to the die while holding the other plate to force portions of the exterior faces of the two plates except for the central portion of one of the plates towards one another to reduce the distance therebetween and to move portions of said plates closer together than said preselected thickness of said electrically insulated wire with portions of the surface of at least the ductile metal plate which abut the electrically insulated wire being compressed and reduced in thickness and with the electrically insulated wire forced at least partially into the surface of at least said ductile metal plate to permanently distort that surface to partially conform to the shape of the electrically insulated wire without producing corresponding distortion of the opposite surface of that ductile metal plate and to at least partially embed the electrically insulated wire in that surface and securing the plates in fixed relation to one another.

11. The method of manufacturing a thin temperature sensing pellet assembly for disposition centrally of a stove surface heater and subject to circumferential heating thereby for sensing the temperature of a body being heated by the heater and having a fine electrically insulated resistance wire of preselected thickness having a high temperature coefficient of resistance and sandwiched between a pair of plates, one of said plates being of ductile metal, one of said plates having an element secured thereto projecting through an aperture in the other plate, which comprises the steps of placing the apertured plate on the element in substantial parallelism with the other plate and spaced therefrom a distance sufficient to permit the movement of the electrically insulated wire therebetween but close enough to insure a single-layer winding of the electrically insulated wire, winding the electrically insulated wire in a single layer between and paralleling and engaging said portions of the plates with those portions guiding the wire in the formation of the layer while preventing the wire from engaging the central portion of the adjacent face of the plates, establishing an intimate heat transfer relationship between the electrically insulated wire and at least one of the plates by applying a force against the exterior face of one of the plates and against portions of the exterior face of the other plate which are spaced from the central portion thereof to force portions of the exterior faces of the two plates except for the central portion of one of the plates towards one another to reduce the distance therebetween and to move portions of said plates closer together than the said preselected thickness of said electrically insulated wire with portions of the surface of at least the ductile metal plate which abut the electrically insulated wire being compressed and reduced in thickness and with the electrically insulated wire forced at least partially into the surface of at least said ductile metal plate to permanently distort that surface to partially conform to the shape of the electrically insulated wire without producing corresponding distortion of the opposite surface of that ductile metal plate and to at least partially embed the electrically insulated wire in that surface and securing the apertured plate in fixed relation to a portion of the element to secure the plates in fixed relation to one another.

12. The method of manufacturing a thin temperature sensing pellet assembly for disposition centrally of a stove surface heater and subject to circumferential heating thereby for sensing the temperature of a body being heated by the heater and having a fine electrically insulated resistance wire of preselected thickness having a high temperature coefficient of resistance and sandwiched between a pair of plates, one of said plates being of ductile metal, one of said plates having an element secured thereto projecting through an aperture in the other plate, which comprises the steps of forming one plate with an element secured thereto and projecting centrally therefrom, forming the other plate with an aperture for receiving the element, placing the apertured plate on the element, forcing the apertured plate towards the other plate to a preselected position with respect thereto in which portions of the plates are spaced apart a distance sufficient to permit the movement of the electrically insulated wire therebetween but close enough to insure a single-layer winding of the electrically insulated wire, holding the plates in that relationship and rotating the plates about the axis of said element relative to the wire to wind the electrically insulated wire in a single layer between and engaging said portions of the plates with those portions guiding the wire in the formation of the layer while applying sufficient tension to the electrically insulated wire to force the turns into abutment with one another, establishing an intimate heat transfer relationship between the electrically insulated wire and at least one of the plates by moving the remote surfaces of the two plates towards one another to reduce the distance therebetween and to move portions of said plates closer together than said preselected thickness of said electrically insulated wire with portions of the surface of at least the ductile metal plate which abut the electrically insulated wire being compressed and reduced in thickness and with the electrically insulated wire forced partially into the surface of at least said ductile metal plate to permanently distort that surface to partially conform to the shape of the electrically insulated wire without producing corresponding distortion of the opposite surface of that ductile metal plate and partially embed the electrically insulated wire in that surface and securing the plates in fixed relation to one another.

13. The method of claim 12 in which in said winding step the inner turn is prevented from entering the central portion of the adjacent faces of the plates so that the single-layer winding is annular in shape, and in which in the step of establishing an intimate heat transfer relationship a force is applied against the exterior face of one of the plates and against portions of the exterior face of the other plate which are spaced from the central portion thereof to force portions of the exterior faces of the two plates except for the central portion of one of the plates towards one another to reduce the distance therebetween, and further including the steps of projecting the ends of the electrically insulated wire through wire-receiving apertures in the apertured plate, placing an electrically insulating member having an element-accepting aperture and two wire receiving apertures therein on the portion of the element which projects through the apertured plate and with the two ends of the wire extending through individual ones of the two wire-receiving apertures therein, and deforming the projecting portion of the element beyond the insulating disk to secure the plates and the insulating disk together.

References Cited in the file of this patent
UNITED STATES PATENTS

| | | |
|---|---|---|
| 519,043 | Jenkins | May 1, 1894 |
| 1,041,293 | Keller | Oct. 15, 1912 |
| 1,096,820 | Ball | May 19, 1914 |
| 1,120,259 | Wiegand | Dec. 8, 1914 |
| 1,794,831 | Caruso | Mar. 3, 1931 |
| 1,956,826 | Engholm | May 1, 1934 |
| 2,282,759 | Gavitt | May 12, 1942 |
| 2,463,984 | Lederer | Mar. 8, 1949 |
| 2,644,065 | Peterson | June 30, 1953 |
| 2,703,833 | Vanvor | Mar. 8, 1955 |
| 2,818,631 | Fearn | Jan. 7, 1958 |